US 6,625,698 B2

(12) United States Patent
Vartti

(10) Patent No.: US 6,625,698 B2
(45) Date of Patent: Sep. 23, 2003

(54) METHOD AND APPARATUS FOR CONTROLLING MEMORY STORAGE LOCKS BASED ON CACHE LINE OWNERSHIP

(75) Inventor: Kelvin S. Vartti, Hugo, MN (US)

(73) Assignee: Unisys Corporation, Blue Bell, PA (US)

( * ) Notice: Subject to any disclaimer, the term of this patent is extended or adjusted under 35 U.S.C. 154(b) by 153 days.

(21) Appl. No.: 09/750,637

(22) Filed: Dec. 28, 2000

(65) Prior Publication Data

US 2002/0174305 A1 Nov. 21, 2002

(51) Int. Cl.[7] .......................... G06F 12/00; G06F 13/00
(52) U.S. Cl. ........................ 711/141; 711/151; 711/158
(58) Field of Search ................................ 711/122, 130, 711/141, 148, 149, 151, 152, 158

(56) References Cited

U.S. PATENT DOCUMENTS

| | | | | |
|---|---|---|---|---|
| 4,901,230 A | * | 2/1990 | Chen et al. ............... | 711/149 |
| 5,247,649 A | * | 9/1993 | Bandoh ..................... | 711/130 |
| 5,404,482 A | * | 4/1995 | Stamm et al. ............. | 711/118 |
| 5,559,986 A | * | 9/1996 | Alpert et al. .............. | 711/144 |
| 5,758,183 A | * | 5/1998 | Scales ........................ | 710/5 |
| 5,761,729 A | * | 6/1998 | Scales ....................... | 711/148 |
| 5,787,480 A | * | 7/1998 | Scales et al. .............. | 711/148 |
| 5,802,585 A | * | 9/1998 | Scales et al. .............. | 711/154 |
| 6,049,672 A | * | 4/2000 | Shiell et al. ............... | 711/141 |
| 6,052,760 A | * | 4/2000 | Bauman et al. ........... | 711/119 |
| 6,356,983 B1 | * | 3/2002 | Parks ........................ | 711/145 |

* cited by examiner

Primary Examiner—Tuan V. Thai
(74) Attorney, Agent, or Firm—Charles A. Johnson; Mark T. Starr; Crawford, Maunu PLLC

(57) ABSTRACT

A system and method for controlling storage locks based on cache line ownership. Ownership of target data segments is acquired at a memory targeted by a first requesting device. A storage lock is enabled that prohibits requesting devices, other than the first requesting device, from acting on the target data segments during the time the targeted memory possesses ownership of the target data segments. A storage lock release signal is issued from the first requesting device to the targeted memory when exclusivity of the target data segments is no longer required at the first requesting device. In response, the storage lock at the targeted memory is released, thereby allowing other requesting devices to act on the target data segments.

21 Claims, 4 Drawing Sheets

METHOD AND APPARATUS FOR CONTROLLING MEMORY STORAGE LOCKS BASED ON CACHE LINE OWNERSHIP

FIELD OF THE INVENTION

This invention relates generally to locking portions of addressable memory in a multiprocessor data processing system, and more particularly to a method and apparatus for controlling storage locks based on cache line ownership.

BACKGROUND OF THE INVENTION

Data processing systems are becoming increasing complex. Some systems, such as Symmetric Multi-Processor (SMP) computer systems, couple two or more Instruction Processors (IPs) and multiple Input/Output (I/O) Modules to shared memory. This allows the multiple IPs to operate simultaneously on the same task, and also allows multiple tasks to be performed at the same time to increase system throughput.

As the number of units coupled to a shared memory increases, more demands are placed on the memory and memory latency increases. To address this problem, high-speed cache memory systems are often coupled to one or more of the processors for storing data signals that are copied from main memory. These cache memories are generally capable of processing requests faster than the main memory while also serving to reduce the number of requests that the main memory must handle, thereby increasing system throughput.

Although the use of cache memories enhances system throughput, it presents new design challenges. When multiple cache memories are coupled to a single main memory for the purpose of temporarily storing data signals, some system must be utilized to ensure that all processors are working from the same (most recent) copy of the data. For example, if a copy of a data item is stored and subsequently modified in a cache memory, another processor requesting access to the same data item must be prevented from using the older copy of the data item stored either in main memory or the requesting processor's cache. This is referred to as maintaining cache "coherency." Maintaining cache coherency becomes more difficult as more cache memories are added to the system, because more copies of a single data item may require tracking.

There are various known methods for addressing this cache coherency quagmire. Some systems achieve coherency by implementing memory (storage) locks. That is, if an updated copy of data existed within a local cache, other processors were prohibited or "locked out" from obtaining a copy of the data from main memory, until the updated copy was returned to main memory which released the lock. More particularly, a storage "lock" is a mechanism by which the exclusive use of a memory location is guaranteed by a requester. When a requester has a location "locked," other requesters are denied access to the storage location until the first requester has completed its exclusive use operation, and has released the lock.

To initiate a storage lock, a requester may issue a specific command, or a command auxiliary to another command, that establishes the lock request (i.e., a storage lock instruction). The system generally waits for an indication that the lock is granted, and then allows the desired modification of the locked location using, for example, a write or store request. If the lock is not granted, the requester is precluded from making the requested modifications at that time, and must cancel, or most likely postpone, the request.

In one particular prior art system, storage locks are implemented using distributed lock CAMs (content addressable memory). The lock CAMs are implemented in a storage controller unit, and store addresses that are currently locked, or are waiting to be locked. Hardware lock logic within the storage controller unit uses the addresses in the CAM and compares them with any new lock requests, suspending (or rejecting) those new requests that are trying to access currently locked locations. For certain processor functions, the processor may require exclusive ownership of the data being processed due to the nature of the function being performed. Such processor functions may correspond to machine language macro-instructions such as the biased-fetch, test-and-set, increment-and-test, or conditional-replace instructions, which are instructions that accommodate the sharing of addressable memory. In order to ensure the exclusive ownership of data during processing of the instruction, the processor must lock the data from other devices in the computer.

However, in complex computing systems where, for example, each requester (e.g., processor) is associated with a different second level cache, yet shares third level cache and main memory with other requesters, a more efficient and effective system and method is needed to coordinate and guarantee exclusive control of data. Further, it would be desirable to utilize any generic memory or storage controller with a particular processing arrangement, without requiring the memory or storage unit to be equipped with hardware to accommodate the storage locking functions. The present invention provides a solution to this problem by providing a storage lock independent of the need for specific hardware in the storage or storage control, and therefore allows generic memory controllers to be used in the processing environment. The present invention therefore provides a solution to the aforementioned and other problems, and offers other advantages over the prior art.

SUMMARY OF THE INVENTION

The present invention relates to a system and method for controlling storage locks based on cache line ownership. The storage lock of the present invention is operable in connection with generic memory systems having no dedicated, hardware-implemented storage locks.

In accordance with one embodiment of the invention, a method is provided for controlling access to addressable, target data segments, to maintain memory coherency. Ownership of the target data segments is acquired at a memory targeted by a first requesting device, such as a processor. A storage lock is enabled that prohibits requesting devices, other than the first requesting device, from acting on the target data segments during the time the targeted memory "owns" the target data segments. A storage lock release signal is issued from the first requesting device to the targeted memory when exclusivity of the target data segments is no longer required at the first requesting device. In response, the storage lock at the targeted memory is released, thereby allowing other requesting devices to act on the target data segments.

In accordance with another embodiment of the invention, a system for maintaining cache coherency is provided. The system includes a main memory module for storing data, and a plurality of cache memory modules to cache portions of the data stored in the main memory module. A plurality of processing modules can each initiate commands requiring exclusive access to targeted cache lines stored in the cache memory module. A storage controller is configured to acquire ownership status of the cache lines targeted by a requesting processing module, and to enact a storage lock on the targeted cache lines while possessing ownership status of the targeted cache lines. The requesting processing module issues a storage lock release signal directing the storage controller to release the targeted cache lines when the requesting processing module has completed the operations requiring exclusivity of the targeted cache lines.

Still other objects and advantages of the present invention will become readily apparent to those skilled in this art from the following detailed description. As will be realized, the invention is capable of other and different embodiments, and its details are capable of modification without departing from the scope and spirit of the invention. Accordingly, the drawing and description are to be regarded as illustrative in nature, and not as restrictive.

BRIEF DESCRIPTION OF THE DRAWINGS

The invention is described in connection with the embodiments illustrated in the following diagrams.

DETAILED DESCRIPTION OF THE ILLUSTRATED EMBODIMENTS

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention provides a system and method for controlling storage locks based on cache line ownership. The storage lock of the present invention is operable in connection with generic memory systems having no dedicated, hardware-implemented storage locks.

Computer systems that contain multiple processors, and share data, require a certain amount of coordination in order to be effective. With a number of functions and commands that the processor performs, the processor must have exclusive ownership of the data being processed. For example, test-and-set, test-and-clear, increment-and-test, decrement-and-test, etc. are commands requiring exclusive ownership of the data by the processor. In order to ensure the exclusive ownership of the data, the data must be locked from other devices in the computing system during processing of that instruction(s).

In a generic memory structure in which the present invention is particularly beneficial, each processor has its own second level cache memory, and shares third level cache and main memory with other processors. In prior systems, the processor was connected to proprietary memory systems having centralized hardware lock logic, or distributed lock logic between memory systems capable of communication therebetween. However, for a generic memory having no such dedicated hardware lock logic, a manner of granting storage locks to requesting devices until its exclusive operations can be completed is required.

The present invention may be used in connection with a processor or multiple processors in a computing environment having a memory, including a single processor system having a single instruction stream, a multi-tasking system, a multi-processing system having multiple processors, a pipelined processing system where instructions are executed in instruction segments along an instruction pipeline, and the like. While the present invention is particularly advantageous in the context of multiprocessing computer systems, the present invention is not limited thereto and is equally applicable in other computing environments requiring storage locking functionality. The present invention is thus not limited to the particular computing environments and embodiments described in the following figures, as will be readily appreciated by those skilled in the art from the description provided herein.

Figure 1:
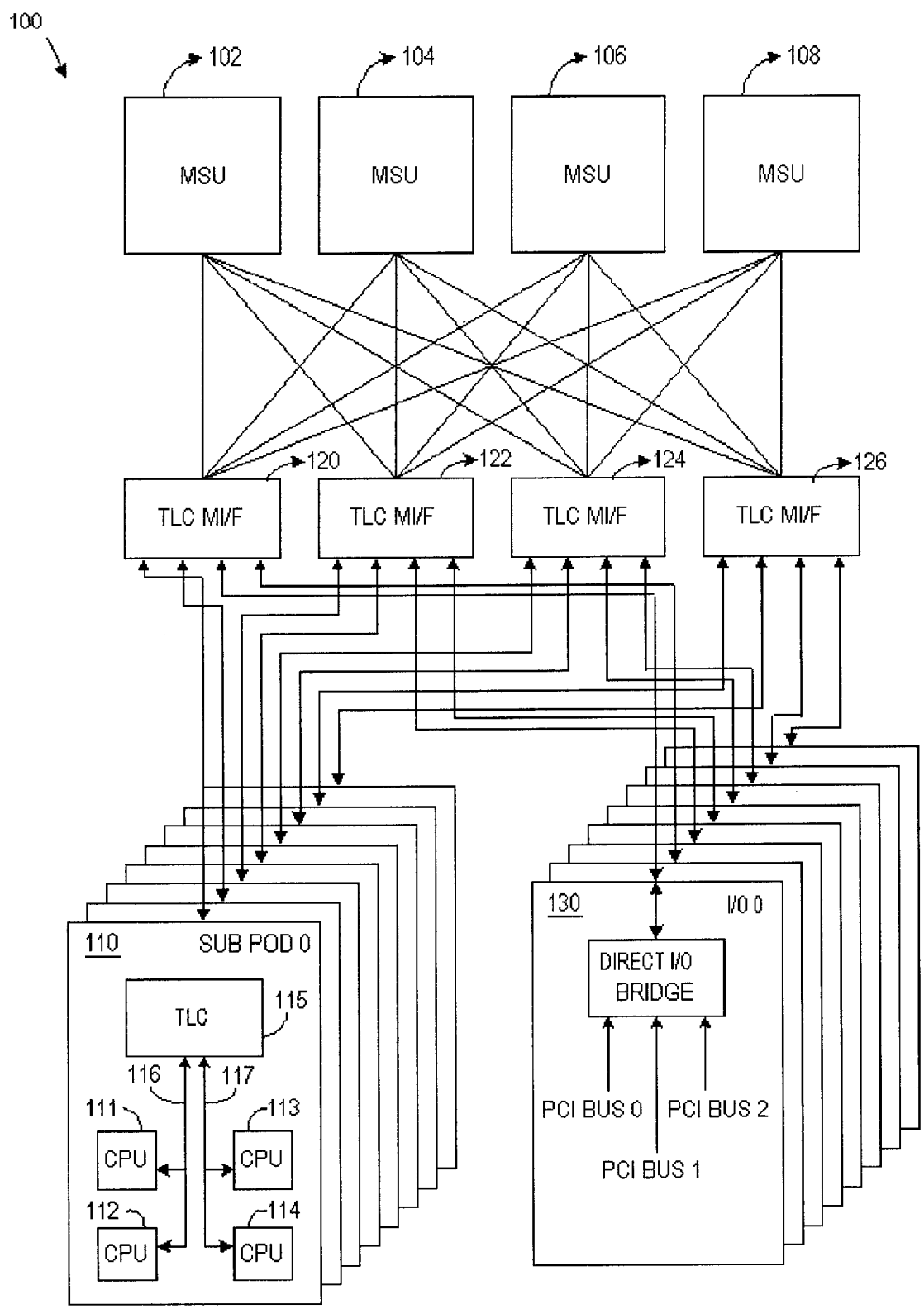
FIG. 1 is a block diagram of a computing system in which the principles of the present invention may be applied.

FIG. 1 is a block diagram of a computing system 100 in which the principles of the present invention may be applied. System 100 includes a main storage module, illustrated as a plurality of Memory Storage Units (MSUs) labeled MSU 102, MSU 104, MSU 106 and MSU 108. The collective MSU represents the main memory, such as random access memory, for the computing system 100. This memory may be accessible to multiple subpods, such as subpod 110, via one or more third level cache memory interfaces (TLC MI/F) 120, 122, 124, 126. The computing system 100 may further include multiple input/output (I/O) modules, such as I/O module 130, that provide the interface between various I/O devices and the subpods. The TLC MI/F circuitry 120, 122, 124, 126 collectively serve as a crossbar module to selectively transfer data between the MSUs, and the I/O modules and subpods.

Each subpod (e.g., subpod 110) includes one or more processing modules, such as modules 111, 112, 113, 114, each of which may include its own first level cache (FLC) and second level cache (SLC), and may in turn be coupled to a third level cache (TLC) 115 via one or more buses 116, 117. An example of such a processing module (e.g., module 111) is provided in the block diagram of FIG. 2. While the particular logic functions within the processing module 200 of FIG. 2 may vary by design, a number of particular logic functions are illustrated in the processing module 200 for purposes of obtaining an understanding of one aspect of the invention.

Figure 2:
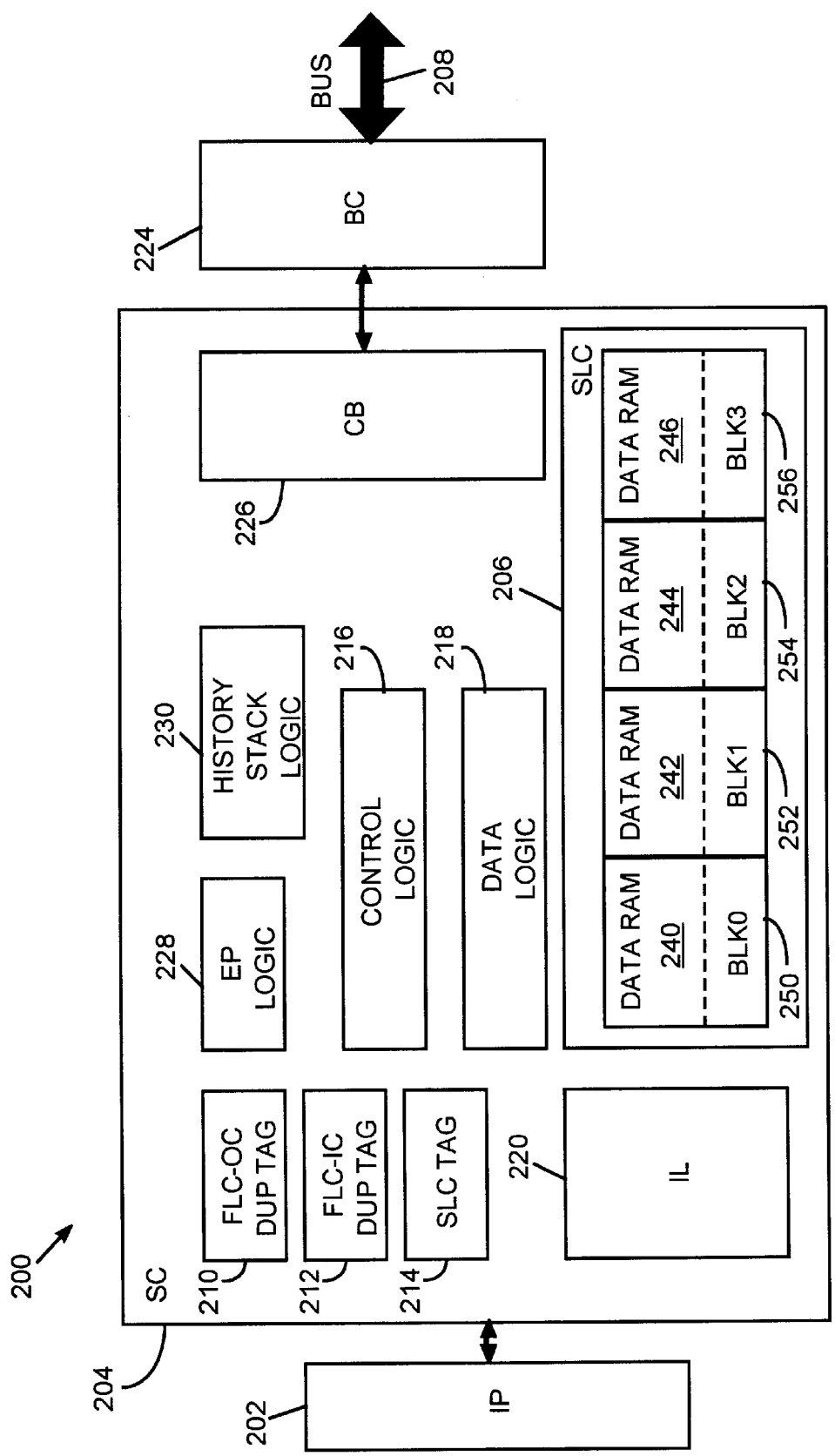
FIG. 2 is a block diagram of an example processing module in which the principles of the present invention may be applied.

Referring now to the example processing module 200 of FIG. 2, an instruction processor (IP) 202 performs various processing operations required by the computing system. The IP 202 interfaces with the storage controller (SC) 204, that includes a second level cache (SLC) 206 and the associated control and interface logic. In one embodiment, the SLC is an ownership-based cache that is dedicated to a single IP. The SC 204 interfaces with a bus 208 depicted in FIG. 1 as bus 116 or 117, which in turn interfaces to the TLC 115 in its respective subpod.

The SC 204 includes a variety of different logic sections, some of which are depicted in FIG. 2. The instruction processor 202 of the present example includes a first level cache (FLC), and because the example computing environment is an ownership-based system, FLC duplication tag logic modules 210 and 212 are provided. In systems having multiple instruction processors with FLCs, multiple SLCs, TLCs, and main storage units, cache coherency must be maintained. Cache coherency protocols ensure that one processor's cached copy of a shared memory location is invalidated when another processor writes to that location, thereby guaranteeing that each processor is always operating on the latest copy of the data.

Various methods may be used to maintain cache coherency. Some systems achieve coherency by implementing hardware memory locks. That is, if an updated copy of data existed within a local cache, other processors were prohibited by hardware in the memory unit from obtaining a copy of the data from main memory until the updated copy was returned to main memory, thereby releasing the lock. Other manners of maintaining cache coherency exist, such as memory bus "snooping", and other techniques. For distributed systems having hierarchical memory structures, directory-based coherency systems have been used. Directory-based coherency systems utilize a centralized directory to record the location and the status of data as it exists throughout the system, thereby determining "ownership" of the data. For example, the directory records which caches have a copy of the data, and further records if any of the caches have an updated copy of the data. When a cache makes a request to main memory for a data item, the central directory is consulted to determine where the most recent copy of that data item resides. Based on this information, the most recent copy of the data is retrieved so it may be provided to the requesting cache. The central directory is then updated to reflect the new status for that unit of memory.

In the example of FIG. 2, FLC cache coherency is achieved by using invalidate logic and associated interfaces in the SC 204 to invalidate FLC cache locations in the IP 202 when cache write functions are performed. Since multiple IPs 202 in different processing modules may contain the same data block in one or both of its caches, all other copies of that data block must be located and invalidated when a requester performs a data write function. Each IP 202 contains two "tag" memories that record which blocks currently reside in its caches. One tag memory is used in connection with the instruction cache, and one with the operand cache. Each SC 204 has a duplicate copy of its associated IP's tag memory that contains copies of the data blocks currently resident in their respective IP caches. The first level cache operand cache (FLC-OC) dup tag logic 210 is the tag memory for the FLC-OC, and the first level cache instruction cache (FLC-IC) dup tag logic 212 is the tag memory for the FLC-IC. Each write request that occurs in the system may generate an invalidate/snoop request to all the other duplicate tags in the system. Each duplicate tag will perform a search to determine if the data block is resident (i.e., a "hit"). If a hit occurs, that IP's tag must be invalidated. Where no hit occurs, no action is required. The second level cache (SLC) tag memory 214 performs an analogous function for the SLC 206.

The control logic 216 controls the access to the SLC 206 based on the SLC tag 214, by generating requests to the data logic (DL) 218. The data logic 218 controls the data flow in the SC 204, including read hit and miss data to the IP 202, as well as other control functions. Generally, the control logic 216 and SLC tag 214 determine whether a request is a hit or a miss in the SLC 206, and if it's a hit, data can be written and read from the SLC 206 if it owns the data—otherwise ownership is acquired, and then the function is performed.

The input logic (IL) 220 captures data requests and prioritizes all requests that the SC 204 is going to act on. The requests include those from the IP 202, and from other processing modules and caches received via the bus 208. The information available at the IL 220 may include the function and address of the request, whether the particular SC 204 "owned" the data for cache coherency purposes, the requester identification, and any other associated request information.

Bus interface logic interfaces the SC 204 to the bus 208. In one embodiment, the bus interface logic is divided into two sections. A first section operates under the clock on the bus 208, which is a slower clock rate than the internal clock rate of the processing module. This first section is the BC (bus control 1) 224. A second section, the CB (bus control 2) 226 interfaces to the ASIC (i.e., processing module 200) that ultimately interfaces with the IL 220 via the data logic 218. The data logic 218 transfers data back and forth between the CB 226 and the IL 220.

The error and partitioning (EP) logic 228 represents an error collection module. Internal errors get routed to the EP 228 and are collected. Once collected, they may be scanned out via a dynamic string to report errors to maintenance logic. The EP 228 may also provide a trigger to start and stop collecting history data in the history stack 230. The history stack logic 230 stores the state of the system upon the occurrence of an internal error.

The SLC 206 includes data storage capability, which in one embodiment includes multiple data RAM storage devices. In one particular embodiment, the cache data storage is contained in 32 16K×22 bit internal RAMs, split across four block sections 240, 242, 244, 246. Associated with the data RAMs is the error logic 250, 252, 254, 256, which includes error correction code (ECC) generation and correction logic, herein generally referred to as "block logic" or BLK logic. In one embodiment, each block is contained in eight RAM devices organized into 32K×2 word (even/odd) blocks. The data RAM address bits are issued from the control logic 216, and an address bit is used to select between the pair of RAM devices.

Ownership refers to the concept that only one storage controller "owns" a particular cache line being manipulated. An SC must gain exclusive ownership of a cache line before data within the cache line may be modified at the request of a processor or other requester. When an SC has exclusive ownership of a cache line, no other requester or SC may have a copy of that cache line in any of its associated caches.

Before an SC can gain exclusive ownership of a cache line, the processors performing operations on SC copies of that cache line must complete any in-progress operations to that cache line. Then, if one or more SCs have shared access to the cache line, the SCs must designate their local copies of the cache line as invalid. This is known as a Purge operation. If, on the other hand, a single SC has exclusive ownership of the requested cache line, and the local copy has been modified, the local copy must be returned to the MSU before the new SC can gain exclusive ownership of the cache line. This is known as a "Return" operation, since the previous exclusive owner returns the cache line to the MSU so it can be provided to the requesting SC, which becomes the new exclusive owner.

In addition to Return operations, data may be written back to an MSU during Flush operations as follows. When an SC receives a cache line from an MSU, and the cache line is to be copied to a cache that is already full, space must be allocated in the cache for the new data. This requires a mechanism to determine which older cache line(s) will be disposed of, or "aged out of" cache to provide the amount of space needed for the new information. If the older data has never been modified, it may be merely overwritten with the new data. However, if the older data has been modified, the cache line including this older data must be written back to the MSU during a Flush operation so that this latest copy of the data is preserved.

Data is also written to an MSU during I/O Overwrite operations. An I/O Overwrite occurs when one of the I/O Modules 130 issues an I/O Overwrite command to the MSU (one or more of MSU 102, 104, 106, 108). This causes data provided by the I/O Module to overwrite the addressed data in the MSU. The Overwrite operation is performed regardless of which other SCs have local copies of the data when the Overwrite operation is performed. The directory state information is updated to indicate that the affected cache line(s) is "Present" in the MSU, meaning the MSU has ownership of the cache line, and will purge any valid copies of that cache line that exist elsewhere in the system.

In addition to having ownership following an Overwrite operation, the MSU is also said to have ownership of a cache line when the MSU has the most current copy of the data and no other agents have a valid local copy of the data. This could occur, for example, after an SC having exclusive data ownership performs a Flush operation of one or more cache lines so that the MSU thereafter has the only valid copy of the data.

Thus, a cache line "state" provides information about what access privileges are associated with the cache line, and further indicates which actions need to be taken by the MSU and the rest of platform before a request concerning a particular cache line may be granted. For example, the cache line data may have to be retrieved from one of the TLC or I/O Caches. In other cases, copies of the cache line may have to be invalidated within one or more TLC or I/O Caches before the MSU can provide the request cache line to the requester.

In one embodiment of a system in which the present invention is applicable, a cache line may be assigned one of a variety of states, including "MSU Owns", "Exclusive", "Shared", "I/O Copy", "I/O Exclusive", "Deferred", and "Error". All cache lines in the MSU are placed in the "MSU Owns" state after system initialization and before any cache lines have been copied into one of the system caches. This is also the state a cache line enters after it is overwritten with new data received from an I/O sub-system such as disk or tape during an Overwrite operation. This state indicates that the MSU has the most recent copy of the cache line. Since only the MSU is considered to have a valid copy of any cache line that is in the MSU Owns state, an error occurs if any of the TLCs or I/O Caches attempts to write to the cache line at this time.

An SC may make a request to an MSU to obtain ownership to modify a copy of a cache line. This request is made on behalf of a TLC associated with that SC. When the TLC is provided with the requested cache line, the cache line transitions to the "Exclusive" state. The TLC receiving the cache line is said to be the "Owner" of that cache line, and thereafter has read/write access rights. Only one cache may be the Owner of a cache line at once. No other cache may have a copy of the cache line while another cache is the Owner. Once the cache line enters the Exclusive state, the copy of the cache line stored within the MSU is no longer considered valid. When the MSU receives requests for a cache line that is in the Exclusive State, the MSU must retrieve the cache line copy from the Owner during a Return operation.

The Exclusive state of ownership is the state of ownership most applicable to the present invention. An SC can grant a lock request only upon obtaining a requisite level of ownership, which, in one embodiment of the invention, is the exclusive state of ownership. However, other ownership states are available in the computing system of the present invention, and it is possible to condition storage lock grants on other ownership states. For purposes of example, some of these other ownership states are touched on below.

An SC may request a copy of a cache line for read-only purposes. When a cache line is copied to one of the TLCs for read-only purposes, the cache line state transitions to the "Shared" state. When in this state, the cache line may reside within one, several, or all of the TLCs in the computing system 100 at once. The MSU is still considered to have a valid copy of the cache, and may provide this cache line to a TLC making a further read-only request.

Another read-only state is the "I/O Copy" state. In the I/O Copy state, the cache line may reside within one I/O Cache and no TLCs. As is the case with the Shared state, the MSU is still considered to have a valid copy of the cache line, and modifications may not occur to the cache line within the I/O Cache. The coherency actions employed when a cache line is in this state are similar to those used when the cache line is in the Shared state. This state is used to provide multiple I/O Sub-systems coupled to I/O Cache with access to MSU data for read-only purposes, thereby reducing the number of requests made to main memory, and I/O-to-memory access times.

The "I/O Exclusive" state allows an I/O Buffer to gain an exclusive copy of the cache line with read/write access rights, thereby becoming the cache line Owner. When the cache line is in this state, no other copies may exist within any other cache in the system. Moreover, the Owner is not forced to return the cache line until it has completed the operation. That is, the MSU does not initiate the return of cache lines in this state as a result of subsequent requests by other units. Instead, the Owner returns the cache line on its own accord. This allows an I/O unit to receive a cache line from the MSU, selectively merge data received from a disk or tape sub-system into the cache line, then write the cache line back to main memory after all updates are completed without an MSU performing any coherency operations. This allows system overhead to be reduced in a manner to be described below.

A cache line may also be in the "Deferred" state, indicating that the cache line state is in transition. The Deferred state is entered when a request is made for a cache line that is either in the Exclusive or I/O Exclusive state. Since the MSU is not considered to have a valid copy of a cache line that is in either the Exclusive or I/O Exclusive states, the request is deferred until the Owner of the cache line returns access rights and/or the modified copy of the cache line to the MSU. Once the MSU issues a Function to the current Owner initiating the return of the cache line, the cache line must transition to this temporary state. Otherwise, the MSU will (erroneously) issue additional Functions to the current Owner if subsequent requests for this cache line are received before the return of the cache line is completed.

A cache line may also transition to an "Error" state. A cache line transitions to the Error state when the MSU receives an unexpected command. For example, if a cache line is in the MSU Owns state, the MSU should contain the only valid copy of the cache line within the Platform. Therefore, a command attempting to write the cache line from a cache to the MSU is considered an illegal and unexpected operation, and will cause the cache line to transition to the Error state. Once a cache line is in the Error state, it may not be accessed. It remains in the Error state until the MSU is re-initialized, or until an I/O Module 140 makes a request to write new data to the entire cache line during an I/O Overwrite operation.

As the foregoing illustrates, various ownership states are possible to trigger a storage lock grant. However, it is common for processor instructions to require storage locks when the cache line is to be modified. Therefore, in a preferred embodiment of the invention, the exclusive ownership state is the ownership state that is to be achieved in order for an SC to issue a storage lock grant.

Figure 3:
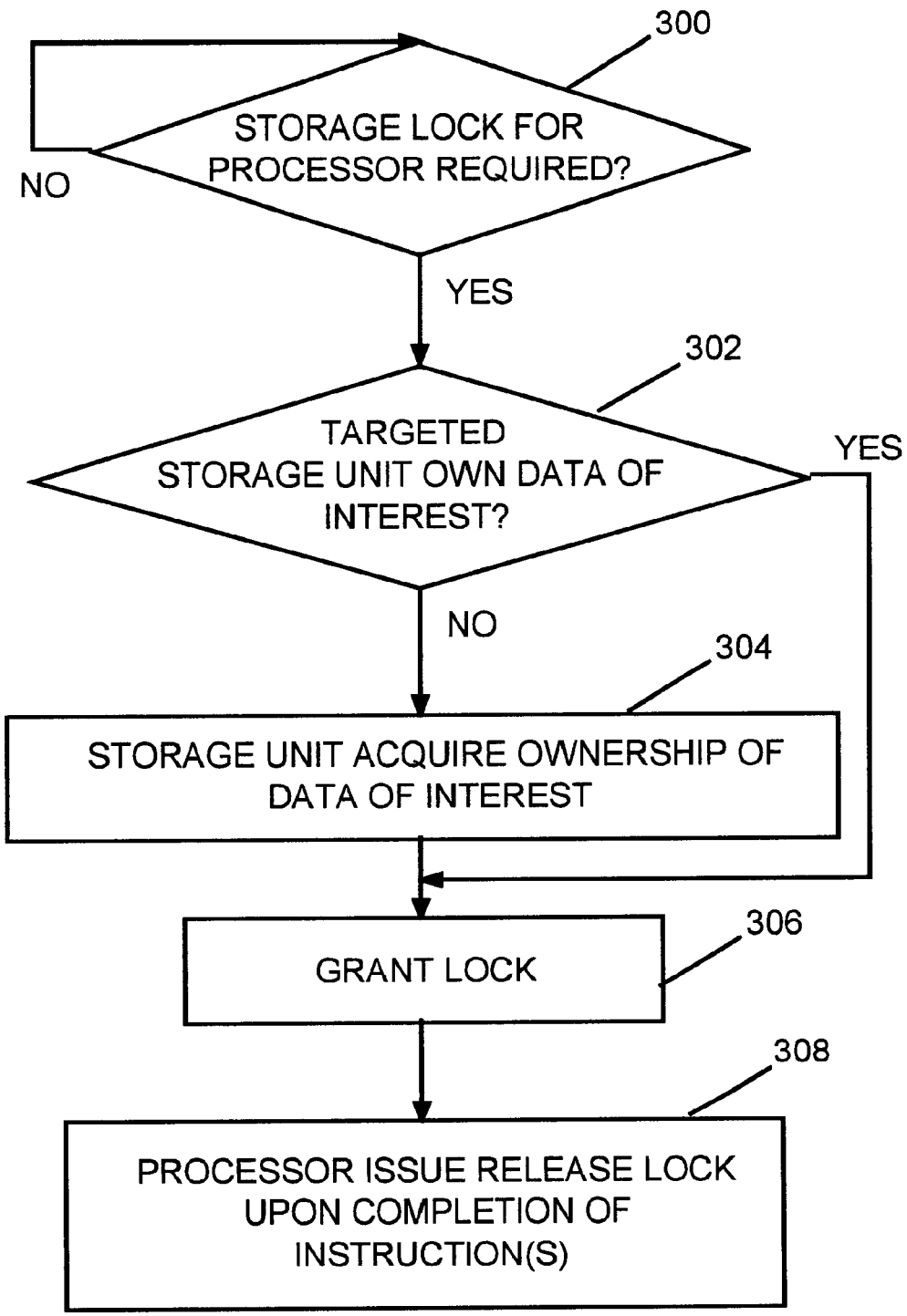
FIG. 3 is a flow diagram illustrating one embodiment of an ownership-based storage lock methodology in accordance with the invention.

Referring now to FIG. 3, a flow diagram is provided of one embodiment of an ownership-based storage lock methodology in accordance with the invention. A requester, such as a processor, may need to perform a function requiring a storage lock. If the processor requires a storage lock as determined at decision block 300, it is then determined whether the targeted storage unit is already deemed the "owner" of the data of interest, as illustrated at decision block 302. The targeted storage unit in a preferred embodiment of the invention is an SC as previously described. While reference to a storage controller (SC) is used primarily throughout this description, the SC is merely an example of a storage module that can be used in connection with the present invention. Generally, any storage module such as a memory, storage or memory controller, or combination thereof may be used in connection with the present invention. Further, the requested data may be generically referred to as a data segment, which includes a block of data regardless of the particular size of the data block, number of bytes, etc. In one particular embodiment described more fully below, the data segment is one or more cache lines associated with a cache memory.

If the SC associated with the processor does not already own the data of interest, the storage unit acquires 304 ownership of that data. If the SC already owns the data, or when the SC has acquired ownership, the storage lock is granted 306 by the SC. With granting the lock as shown at block 306, the storage controller essentially locks out other data requesters, such as other processors, from accessing the targeted data while it is locked for the benefit of the original requesting processor. In one embodiment, cache lines or other data segments that are subject to a storage lock are maintained in a registry. When other data requesters make a request for a cache line(s), the registry is checked by comparing the entries in the registry to the newly requested cache line(s). If the newly requested cache line is identified in the registry, the new request for that cache line will be delayed until that cache line is no longer subject to the storage lock. If the newly requested cache line is not in the registry, the cache line is not locked may be readily obtained.

Upon completion of the instruction(s) or other use of the data of interest, the requesting processor releases the lock, such as by issuing a release lock notification as shown at block 308. In this manner, storage lock processing is based on cache ownership and the requesting processor notifying the memory/SC when exclusive data processing is complete, thereby eliminating a need for dedicated hardware lock logic at the memory or SC.

Figure 4:
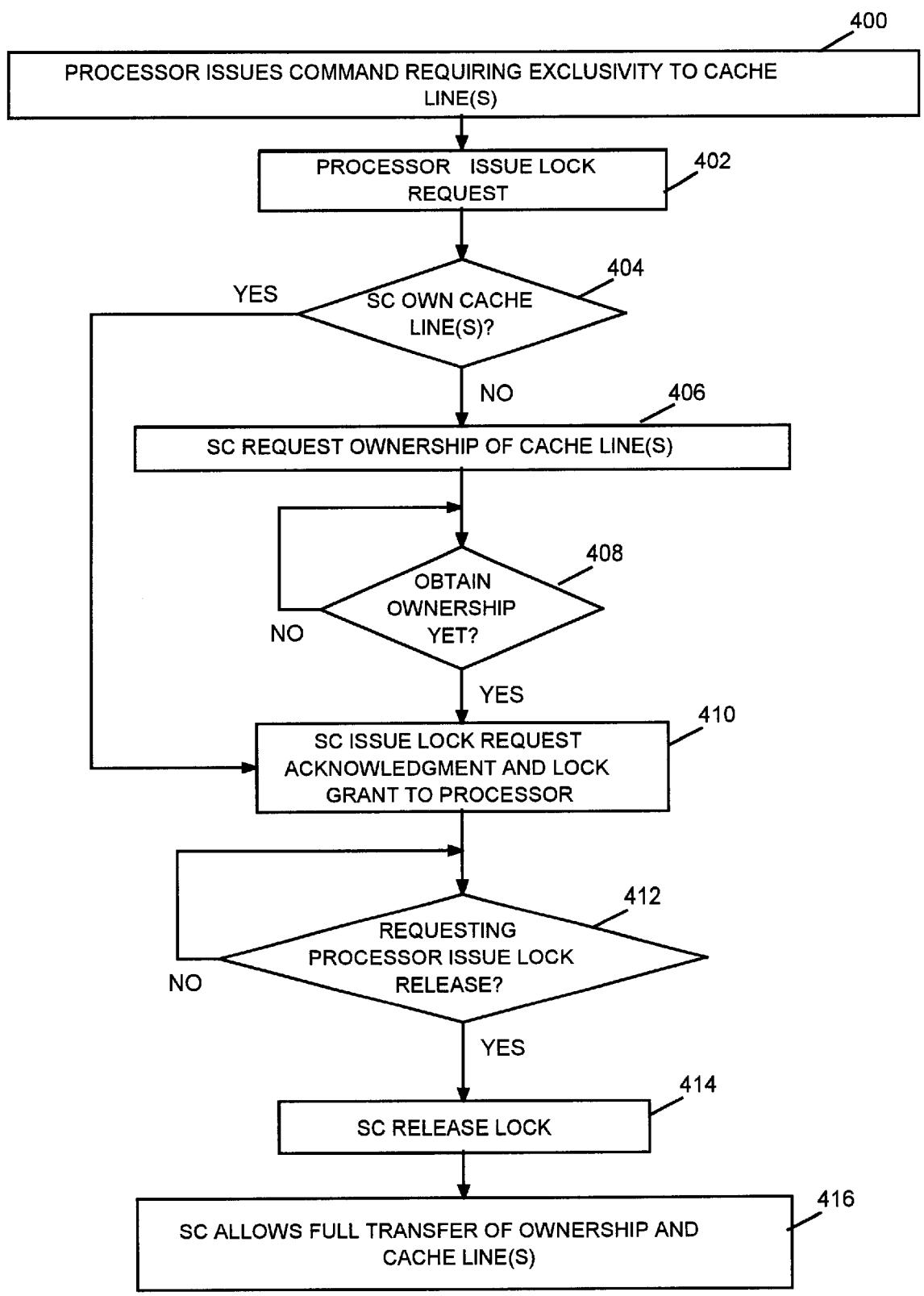
FIG. 4 is a flow diagram of a more detailed embodiment of the ownership-based storage lock methodology in accordance with the invention.

Referring now to FIG. 4, a flow diagram of a more detailed embodiment of the storage lock methodology in accordance with the invention is provided. A processor issues 400 a command requiring exclusivity to one or more cache lines. Various types of commands issued by the processor may require such exclusivity. For example, a command to increment an address would require that no other processor be able to manipulate that address during the time it is being incremented by the requesting processor. An example of such a command is illustrated in Example 1 below:

| Processor Instruction | SC Functions |
|---|---|
| INC A | Read with Lock A (obtain current value) |
|  | Write A (increment value) |
|  | Lock Release |

EXAMPLE 1

In this example, the processor indicates that it would like to increment address A. This can be accomplished by reading the address A, adding one to the value of A, and writing A back to the memory. Multiple processors could be issuing such an INC A command at the same time, so the locking function guarantees that only one processor will be in this sequence of code at a time, thereby allowing every processor increment to be properly observed.

Where the command is such that cache line exclusivity is required, the processor issues 402 a lock request. In one embodiment of the invention, this is accomplished using commands that cause the SC to perform a "read with lock" function, such as described in connection with Example 1 above. This lock request notifies the SC that the processor needs exclusive control of the cache line, such that no other processor or requester can modify or otherwise manipulate the cache line during the time that the cache line is locked.

The present invention allows cache lines to be locked without requiring the memory or storage control to include hardware to perform the locking function. In this manner, a generic memory can be configured to perform locking functions, even though not equipped with specific hardware to perform such locking. The present invention accomplishes this by requiring the target SC (or other memory module) to obtain "ownership" of the cache line. Once the owner of the one or more cache lines, the SC can grant storage locks and release the locks upon notification by the requester that the lock is no longer necessary. Thus, if the SC already "owns" the cache line for purposes of maintaining cache coherency after the processor has issued a lock request on the bus, the SC does not need to acquire ownership of the cache line. If the SC does not already own the cache line as determined at decision block 404, the SC (or other memory) makes a request for ownership of the cache line as seen at block 406. When the SC obtains ownership as determined at decision block 408, the SC issues 410 an acknowledgment of the lock request, and provides a lock grant to the requesting processor. If the SC already owned the cache line as determined at decision block 404, the SC can issue 410 the acknowledgment and lock grant without taking additional steps to acquire ownership of the cache line. Once the SC issued the lock grant, the cache line(s) is locked from access to other processors by the SC. In one embodiment, the cache lines subject to the storage lock are maintained in a memory register, and when other processors make a request for a cache line(s), the memory register is checked by comparing the entries in the registry to the newly requested cache line(s). If the newly requested cache line is identified in the register, the new request for that cache line will be delayed until that cache line is no longer subject to the storage lock. If the newly requested cache line is not in the register, the cache line is not locked may be readily obtained. In another embodiment, the storage controller includes a content addressable memory (CAM) to store the addresses corresponding to each of the targeted cache lines currently subject to the storage lock. The addresses in this CAM are the compared to addresses of subsequently requested cache lines to determine whether or not the newly requested cache line(s) is subject to the storage lock.

Once the acknowledgment and lock grant have been issued back to the requesting processor, the cache line(s) will be locked until the processor or other requesting device has completed its operations. When the processor has completed these operations requiring exclusivity to the cache line(s), the requesting processor will issue a lock release indication. When the processor issues the lock release as determined at decision block 412, the SC will release the lock on that particular cache line as shown at block 414. Upon releasing the lock, the SC will allow full transfer of ownership and the cache line(s) as shown at block 416. In one embodiment, if another processor wanted ownership while the processor had a "lock grant," the SC would allow the transfer of ownership to the other processor, but would delay the data transfer of the locked cache line until the processor actually issued the lock release.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

One skilled in the art of computer science from the description provided herein will be able to combine the software created as described with appropriate general purpose or special purpose computer hardware to create a computer system and/or computer subcomponents embodying the invention, and to create a computer system and/or computer subcomponents for carrying out methods of the invention.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for controlling access to addressable, target data segments in order to maintain memory coherency, the method comprising:
   acquiring ownership status of the target data segments at a memory targeted by a first requesting device;
   enacting a storage lock by prohibiting requesting devices other than the first requesting device from acting on the target data segments while the targeted memory possesses ownership status of the target data segments;
   issuing a storage lock release signal from the first requesting device to the targeted memory when exclusivity of the target data segments is no longer required at the first requesting device; and
   releasing the storage lock, thereby allowing other requesting devices to act on the target data segments, in response to the storage lock release signal.

2. The method as in claim 1, wherein acquiring ownership of the target data segment comprises obtaining ownership of the target data segment upon receipt of a notification from the first requesting device that temporary exclusivity of access to the target data segments is desired.

3. The method as in claim 1, wherein acquiring ownership of the target data segment comprises maintaining ownership of the target data segment if the targeted memory possessed ownership status of the target data segments prior to receipt of a notification from the first requesting device that temporary exclusivity of access to the target data segments is desired.

4. The method as in claim 1, wherein enacting a storage lock comprises granting a storage lock request through issuance of a lock grant signal to the first requesting device in response to acquiring ownership of the target data segments.

5. The method of claim 1, further comprising storing identifying information corresponding to each of the target data segments currently subject to the storage lock.

6. The method of claim 5, wherein the identifying information comprise addresses of the one or more data segments subject to the storage lock.

7. The method of claim 6, further comprising comparing the stored addresses to an address issued by a second requesting device to determine whether the data segment requested by the second requesting device is subject to the storage lock.

8. The method of claim 1, further comprising issuing at least one command from the first requesting device that requires modification of the target data segments.

9. The method of claim 8, further comprising issuing a lock request from the first requesting device to the targeted memory to establish a need for temporary exclusivity of access to the target data segment.

10. The method of claim 1, further comprising allowing ownership of the target data segments to be transferred after the storage lock is released at the targeted memory.

11. The method of claim 1, further comprising allowing ownership of the target data segments to be transferred prior to release of the storage lock, while transferring the target data segments to a new owner only after the storage lock is released at the targeted memory.

12. The method of claim 1, wherein the first requesting device is a processor in a multi-processing computer system.

13. The method of claim 1, wherein the targeted memory is a cache memory and the target data segments comprise one or more cache lines in the cache memory.

14. A system for maintaining cache coherency, comprising:
   a main memory module for storing data;
   a plurality of cache memory modules coupled to the main memory module to cache at least a portion of the data stored in the main memory module;
   a plurality of processing modules each capable of initiating commands requiring exclusive access to targeted cache lines stored in the cache memory module;
   a storage controller configured to acquire ownership status of the cache lines targeted by a requesting processing module and to effect a storage lock on the targeted cache lines while possessing ownership status of the targeted cache lines; and
   wherein the requesting processing module issues a storage lock release signal directing the storage controller to release the targeted cache lines when the requesting processing module has completed the operations requiring exclusivity of the targeted cache lines.

15. The system as in claim 14, wherein the storage controller is further configured to release the storage lock, thereby allowing other processing modules to act on the targeted cache lines, in response to the storage lock release signal.

16. The system as in claim 14, wherein each of the processing modules is configured to issue a storage lock request upon issuance of a command requiring exclusive access to the targeted cache lines.

17. The system as in claim 16, wherein the storage controller is further configured to grant the storage lock request made by the requesting processing module through return of a lock grant signal to the requesting processing module, if and when the storage controller acquires ownership of the targeted cache lines.

18. The system as in claim 16, wherein the storage controller further comprises a content addressable memory to store addresses corresponding to each of the targeted cache lines currently subject to the storage lock.

19. The system as in claim 18, wherein the storage controller further comprises a compare module to compare the addresses stored in the content addressable memory to an address issued by a second requesting processing module to determine whether the cache line requested by the second requesting processing module is subject to the storage lock.

20. A computer-readable medium having computer-executable instructions for managing storage locks, the computer-executable instructions performing steps comprising:

acquiring ownership status of the target data segments at a memory targeted by a first requesting device;

enacting a storage lock by prohibiting requesting devices other than the first requesting device from acting on the target data segments while the targeted memory possesses ownership status of the target data segments;

issuing a storage lock release signal from the first requesting device to the targeted memory when exclusivity of the target data segments is no longer required at the first requesting device; and releasing the storage lock, thereby allowing other requesting devices to act on the target data segments, in response to the storage lock release signal.

21. An apparatus for controlling access to otherwise addressable, target data segments in order to maintain memory coherency, comprising:

means for acquiring ownership status of the target data segments at a memory targeted by a first requesting device;

means for enacting a storage lock by prohibiting requesting devices other than the first requesting device from acting on the target data segments while the targeted memory possesses ownership status of the target data segments;

means for issuing a storage lock release signal from the first requesting device to the targeted memory when exclusivity of the target data segments is no longer required at the first requesting device; and means for releasing the storage lock, thereby allowing other requesting devices to act on the target data segments, in response to the storage lock release signal.

* * * * *